(12) United States Patent
Wen et al.

(10) Patent No.: US 9,367,511 B2
(45) Date of Patent: Jun. 14, 2016

(54) SYSTEM METHOD FOR MANAGING USB DATA TRANSFERS BY SORTING A PLURALITY OF ENDPOINTS IN SCHEDULING QUEUE IN DESCENDING ORDER BASED PARTIALLY ON ENDPOINT FREQUENCY

(71) Applicant: Marvell World Trade Ltd., St. Michael (BB)

(72) Inventors: Xingzhi Wen, Fremont, CA (US); Yu Hong, Shanghai (CN); Hefei Zhu, Shanghai (CN); Jeanne Q Cai, Fremont, CA (US); Yan Zhang, Sunnyvale, CA (US); Shaori Guo, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/333,030

(22) Filed: Jul. 16, 2014

(65) Prior Publication Data

US 2015/0026369 A1 Jan. 22, 2015

Related U.S. Application Data

(60) Provisional application No. 61/846,793, filed on Jul. 16, 2013.

(51) Int. Cl.
*G06F 13/00* (2006.01)
*G06F 3/00* (2006.01)
*G06F 13/42* (2006.01)

(52) U.S. Cl.
CPC ................... *G06F 13/4295* (2013.01)

(58) Field of Classification Search
CPC ..................................................... G06F 13/4295
USPC ................................ 710/33, 36, 39; 455/41.3
See application file for complete search history.

(56) References Cited

U.S. PATENT DOCUMENTS

| 8,364,083 | B2* | 1/2013 | Baek et al. ................... 455/41.3 |
| 8,700,821 | B2* | 4/2014 | Chandra et al. ................. 710/38 |
| 8,953,644 | B2* | 2/2015 | Chandra et al. ............... 370/503 |
| 2003/0061381 | A1 | 3/2003 | Brisebois et al. |
| 2007/0294457 | A1* | 12/2007 | Gantman .............. G06F 3/0605 710/313 |
| 2010/0030930 | A1 | 2/2010 | Connor |

(Continued)

OTHER PUBLICATIONS

Compaq et al. "Universal Serial bus Specification": USB Implementers Forum, Revision 2.0; Publication [online]. Apr. 27, 2000 [retrieved Oct. 7, 2014]. Retrieved from the Internet: <URL: http://www.usb.org/developers/docs/usb20_docs/#usb20spec>; p. 32.

(Continued)

*Primary Examiner* — Tammara Peyton

(57) ABSTRACT

System and methods are provided for managing universal-serial-bus (USB) data transfers. An example system includes a non-transitory computer-readable storage medium including a first scheduling queue for sorting endpoints and a host controller. The host controller is configured to: store a plurality of endpoints for data transfers to the storage medium, an endpoint corresponding to a portion of a USB device; sort the plurality of endpoints in a first order; generate a first transmission data unit including multiple original data packets, the original data packets being allocated to the plurality of endpoints based at least in part on the first order; and transfer the first transmission data unit.

16 Claims, 7 Drawing Sheets

(56) References Cited

U.S. PATENT DOCUMENTS

2010/0049885 A1 2/2010 Chandra et al.
2010/0069006 A1 3/2010 Baek

OTHER PUBLICATIONS

International Search Report and Written Opinion dated Oct. 27, 2014 issued in related/corresponding PCT/US14/46859 filed Jul. 16, 2014.

\* cited by examiner

SYSTEM METHOD FOR MANAGING USB DATA TRANSFERS BY SORTING A PLURALITY OF ENDPOINTS IN SCHEDULING QUEUE IN DESCENDING ORDER BASED PARTIALLY ON ENDPOINT FREQUENCY

CROSS-REFERENCE TO RELATED APPLICATIONS

This disclosure claims priority to and benefit from U.S. Provisional Patent Application No. 61/846,793, filed on Jul. 16, 2013, the entirety of which is incorporated herein by reference.

FIELD

The technology described in this patent document relates generally to data transfer and more particularly to data transfer management.

BACKGROUND

Universal Serial Bus (USB) is a standard developed to allow plug and play or hot swapping connectivity and to replace legacy serial and parallel ports between a host and peripheral devices. USB corresponds to a polled bus in which one or more attached peripheral devices (i.e., USB devices) share a bus bandwidth through a host-scheduled protocol. A USB device is allowed to be attached, configured, used, and detached while the host and other USB devices are operating.

Usually, USB data transfer occurs between a host and a USB device. When a USB device is first connected to a host, an enumeration process begins. A reset signal is sent to the USB device to determine a data rate of the USB device. Then, information associated with the USB device is read by the host and the USB device is assigned a unique address. A host controller directs raffle flow from/to the USB device. For example, the host controller executes USB operations to move data between host memory and device endpoints, where each device endpoint corresponds to a uniquely addressable portion of a USB device that is the source or sink of data in a communication flow between the host and the USB device.

Four basic types of data transfers are supported by USB specifications: control data transfer, bulk data transfer, interrupt data transfer, and isochronous data transfer. The control data transfer is often used for non-periodic, host software-initiated request/response communication (e.g., for command/status operations). The bulk data transfer is usually used for non-periodic, large-packet communication that can use any available bandwidth and can be delayed until the bandwidth is available. For example, data received by a printer in one big packet may be transferred using the bulk data transfer. In addition, the interrupt data transfer is often used for low-frequency, bounded-latency communication. For example, a mouse or a keyboard that sends very little data may use the interrupt data transfer. The isochronous data transfer, known also as streaming real time transfer, is usually used for periodic, continuous communication between a host and a USB device (e.g., communication involving time-sensitive information). For example, a streaming device (e.g., an audio speaker) may use the isochronous data transfer.

USB data transfers are scheduled by the host controller. For example, periodic data transfers, such as the isochronous data transfer and the interrupt data transfer, often have strict timing requirements, and thus need to move across the bus in a timely manner. Non-periodic data transfers, such as the bulk data transfer and the control data transfer, often do not have strict timing requirements. To ensure synchronization between the host and USB devices, the bus time is often divided into fixed-length segments. For low-speed or full-speed buses, the bus time is divided into 1 millisecond units, i.e., frames. For a high-speed bus, the bus time is divided into 125 microsecond units, i.e., microframes. A microframe includes multiple data packets, and a data packet includes 1 kbytes.

SUMMARY

In accordance with the teachings described herein, system and methods are provided for managing universal-serial-bus (USB) data transfers. An example system includes a non-transitory computer-readable storage medium including a first scheduling queue for sorting endpoints and a host controller. The host controller is configured to: store a plurality of endpoints for data transfers to the storage medium, an endpoint corresponding to a portion of a USB device; sort the plurality of endpoints in a first order; generate a first transmission data unit including multiple original data packets, the original data packets being allocated to the plurality of endpoints based at least in part on the first order; and transfer the first transmission data unit.

In one embodiment, a method is provided for managing universal-serial-bus (USB) data transfers. A plurality of endpoints are received for data transfers. An endpoint corresponds to a portion of a USB device. The plurality of endpoints are sorted in an order. A transmission data unit including multiple data packets is generated. The data packets are allocated to the plurality of endpoints based at least in part on the order. The transmission data unit is transferred.

In another embodiment, a non-transitory machine-readable storage medium includes programming instructions for managing universal-serial-bus (USB) data transfers. The programming instructions are configured to cause one or more data processors to execute certain operations. A plurality of endpoints are received for data transfers. An endpoint corresponds to a portion of a USB device. The plurality of endpoints are sorted in an order. A transmission data unit including multiple data packets is generated. The data packets are allocated to the plurality of endpoints based at least in part on the order. The transmission data unit is transferred.

DETAILED DESCRIPTION

Universal Serial Bus (USB) data transfers are usually initiated by a host that manages (e.g., schedules) periodic data transfers and non-periodic data transfers. To a large extent, the performance of a USB system depends on efficiency of data transfer management. Oftentimes, 80%-90% of the bandwidth of a USB bus is allocated to periodic data transfers. Thus, the management of periodic data transfers plays a critical role for improving the performance of the USB system.

Figure 1:
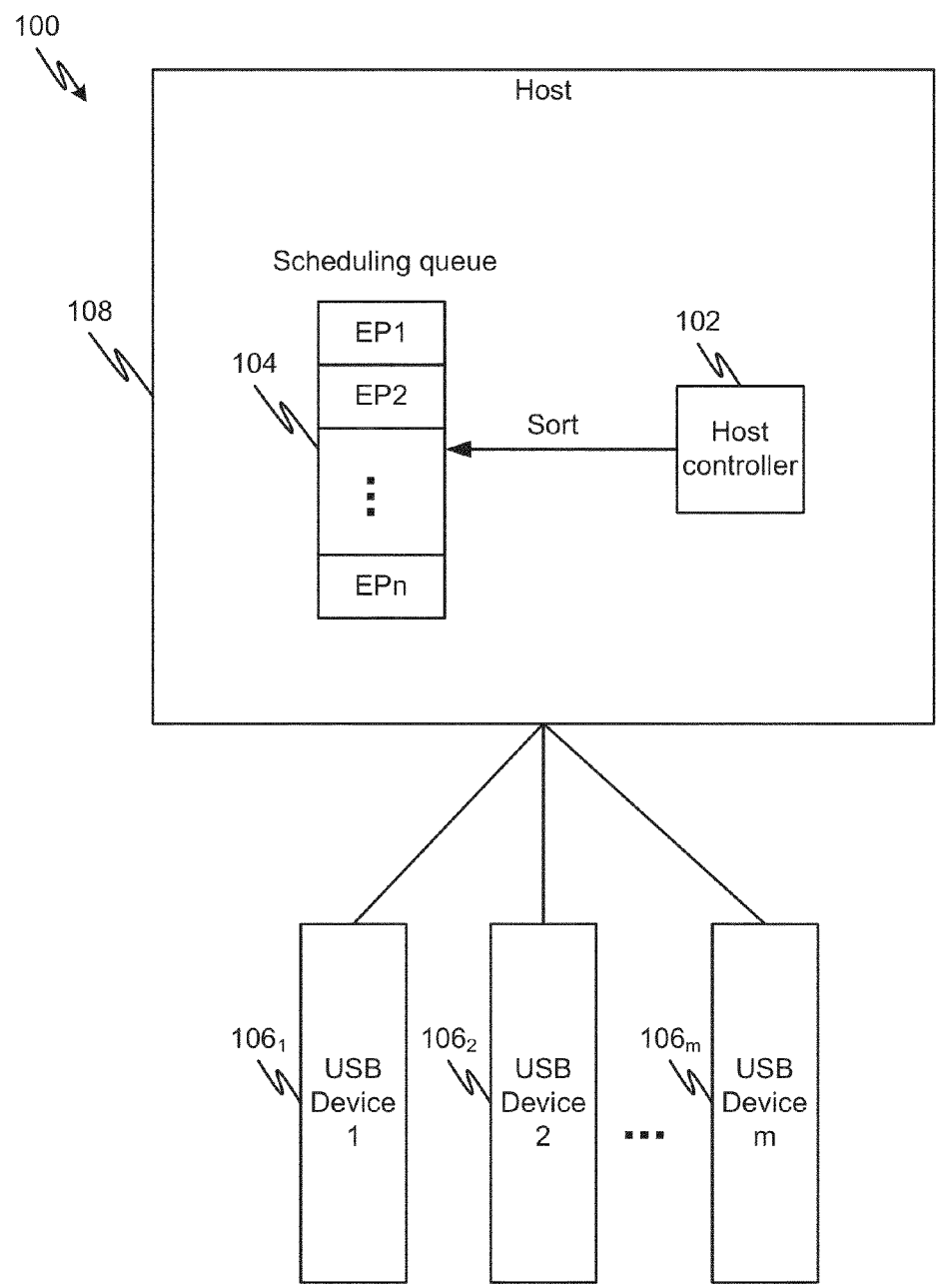
FIG. 1 depicts an example diagram showing a system for managing USB data transfers.

FIG. 1 depicts an example diagram showing a system for managing USB data transfers. As shown in FIG. 1, a host controller 102 sorts multiple endpoints (e.g., EP1, EP2, . . . , EPn) stored in a scheduling queue 104 in a particular order and allocates resources to the sorted endpoints according to the particular order for data transfers (e.g., periodic data transfers).

Specifically, the system 100 includes a number of USB devices $106_1, 106_2, \ldots, 106_m$ attached to a host 108. Each of the multiple endpoints (e.g., EP1, EP2, . . . , EPn) corresponds to a uniquely addressable portion of a USB device. In some embodiments, each endpoint is associated with a frequency, and the host controller 102 sorts the endpoints based on the respective frequencies. For example, the host controller 102 may sort the endpoints in a descending order, where the endpoint with a highest frequency is stored at the top of the scheduling queue 104 and receives resources first for data transfer.

In certain embodiments, each endpoint is associated with an endpoint bandwidth for data transfer, and the host controller 102 sorts the endpoints based on the respective endpoint bandwidths. For example, the host controller 102 may sort the endpoints in a descending order, where the endpoint with a highest endpoint bandwidth is stored at the top of the scheduling queue 104 and receives resources first for data transfer. In some embodiments, the scheduling queue 104 is included in a memory device accessible to the host controller 102.

The host controller 102 generates a transmission data unit (e.g., a microframe) that includes multiple data packets (e.g., 16 data packets). The data packets in the transmission data unit are allocated to the endpoints stored in the scheduling queue 104 (e.g., from top down). After the transmission data unit with allocated data packets is transmitted, the host controller 102 generates more transmission data units to perform data transfers (e.g., isochronous data transfers, interrupt data transfers, etc.) for the sorted endpoints.

Figure 2:
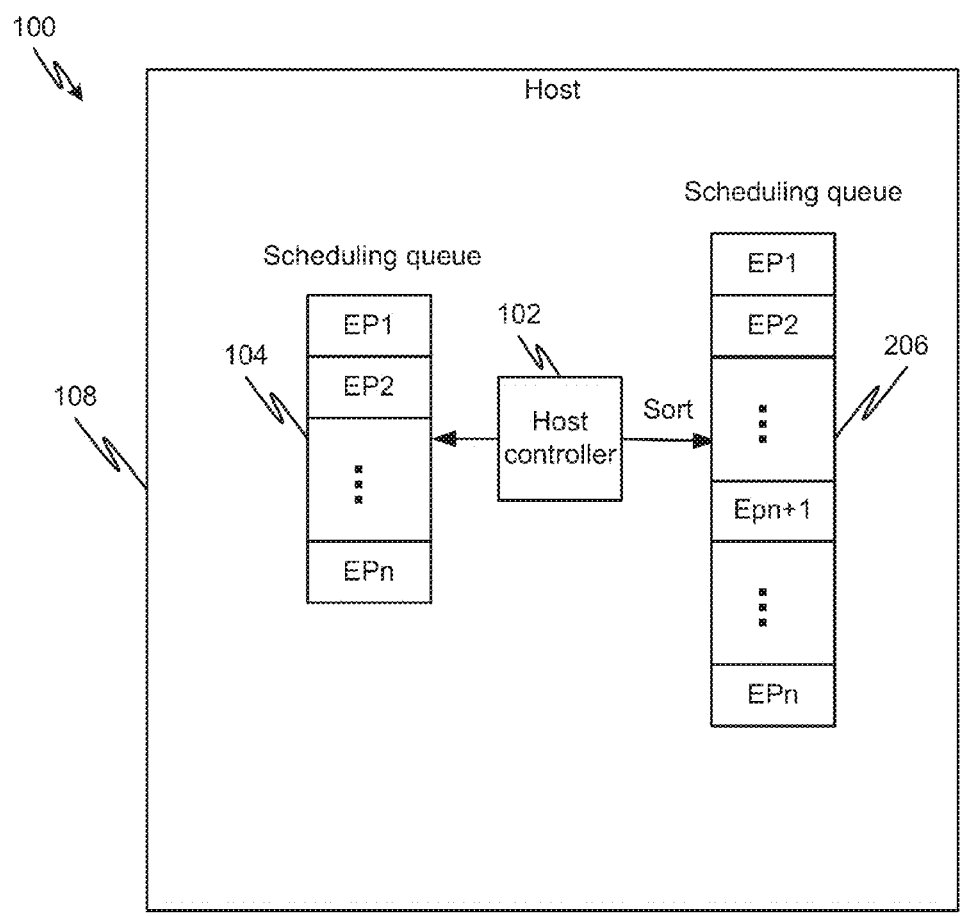
FIG. 2 depicts another example diagram showing a system for managing USB data transfers.

FIG. 2 depicts another example diagram showing a system for managing USB data transfers. As shown in FIG. 2, the host controller 102 manages two scheduling queues 104 and 206 for data transfers, where the scheduling queue 104 is used as a currently active queue and the scheduling queue 206 is used as a backup queue. After storing a new endpoint to the scheduling queue 206, the host controller 102 sorts the scheduling queue 206 and switches from the scheduling queue 104 to the scheduling queue 206 for data transfers (e.g., periodic data transfers).

Particularly, when a new endpoint Epn+1 is received, the host controller 102 stores the new endpoint Epn+1 to the scheduling queue 206 that also includes the multiple endpoints (e.g., EP1, EP2, . . . , EPn), instead of the currently active queue 104, so that the current operations of the system 100 are not disrupted. The host controller 102 sorts the endpoints (e.g., EP1, EP2, . . . , Epn, Epn+1) stored in the scheduling queue 206, and switches from the scheduling queue 104 to the scheduling queue 206 so that the scheduling queue 206 becomes the active queue while the scheduling queue 104 serves as the backup queue. Subsequently, if another new endpoint is received, it will be stored to the scheduling queue 104.

Figure 3:
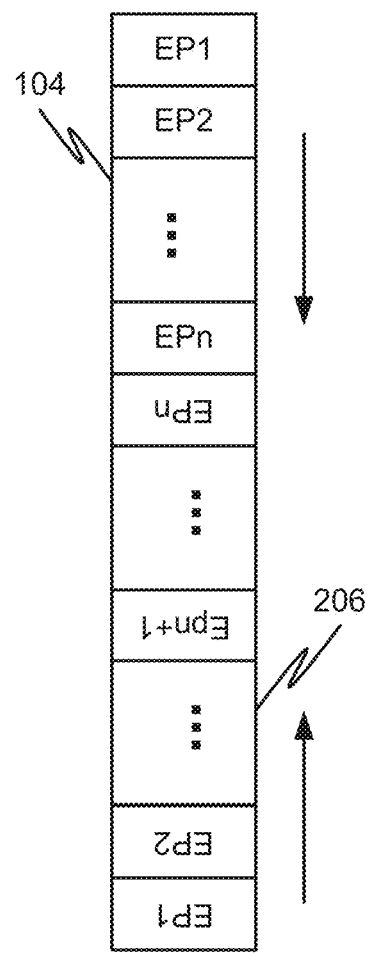
FIG. 3 depicts an example diagram showing two scheduling queues included in a memory device.

In some embodiments, the scheduling queue 104 and the scheduling queue 206 are included in a same memory device accessible to the host controller 102, as shown in FIG. 3. For example, the scheduling queue 104 is processed from top down, and the scheduling queue 206 is processed from bottom up. In certain embodiments, the scheduling queue 104 and the scheduling queue 206 are included in different memory devices accessible to the host controller 102. In some embodiments, not more than 80% of a transmission data unit is allocated for periodic data transfers, and the remaining transmission data unit is allocated for non-periodic data transfers (e.g., control data transfers, bulk data transfers, etc.). In certain embodiments, the data packets of the transmission data unit are allocated to up to three endpoints for periodic data transfers.

As an example, an available bandwidth for the system 100 is 16 packets per microframe. The host controller 102 manages data transfers for three isochronous endpoints (e.g., EP A, EP B, EP C). Particularly, the host controller 102 calculates a total bandwidth needed for the three endpoints, e.g., through a command processor by processing a configured endpoint command. If the total bandwidth needed is no more than the available bandwidth, the host controller 102 accepts the associated configuration. Otherwise, the host controller 102 generates an error signal.

Table 1 shows endpoint bandwidths associated with the three isochronous endpoints. As shown in Table 1, maximum endpoint-service-interval-time payloads corresponding to the three isochronous endpoints, EP A, EP B and EP C are 8 packets, 10 packets, and 12 packets, respectively. According to the respective transmission time intervals, these three endpoints have endpoint bandwidths of 8 packet per microframe, 4 packets per microframe, and 4 packets per microframe, respectively. The total bandwidth needed for this configuration is 16 packets per micro-frame, which is the same as the available bandwidth. Thus, the configuration is accepted. Data packets in a microframe (e.g., 16 data packets) may be allocated to the endpoints, EP A, EP B and EP C, according to the endpoint bandwidths.

TABLE 1

| Endpoints | Max ESIT Payload | Intervals | bandwidth (packets/uF) |
|---|---|---|---|
| EP A | 8 packet | 0 (every micro-frame) | 8 |
| EP B | 10 packets | 1 (every 2 micro-frame) | 4 |
| EP C | 12 packets | 2 (every 4 micro-frame) | 4 |
| total | | | 16 |

Figure 4:
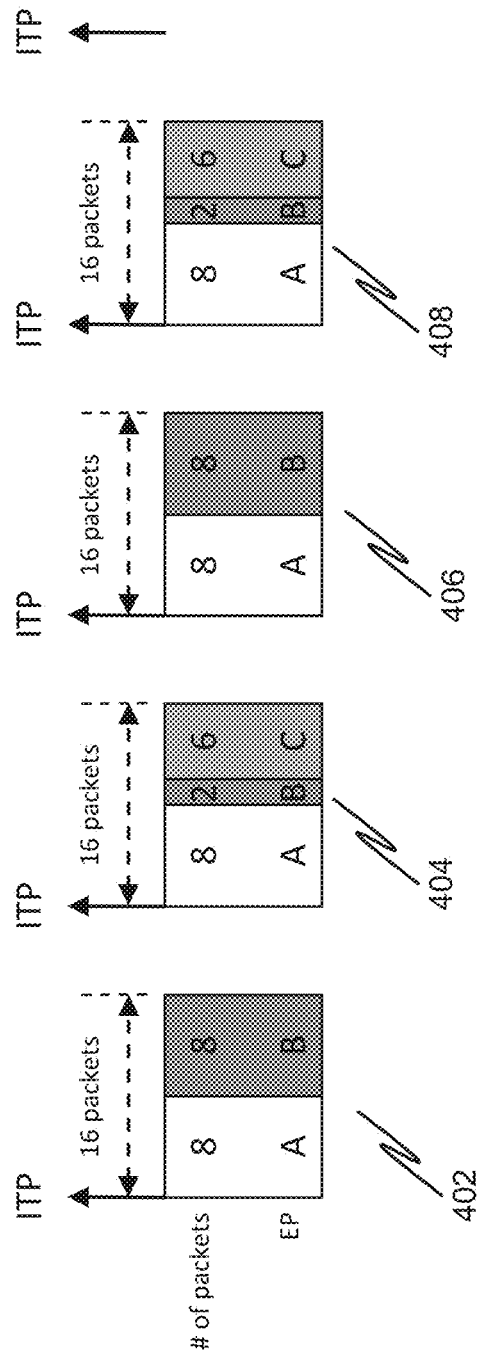
FIG. 4 depicts an example diagram showing data transfers for three endpoints.

FIG. 4 depicts an example diagram showing data transfers for three endpoints. Data from the three endpoints (e.g., EP A, EP B and EP C) is transferred periodically using multiple microframes. As shown in FIG. 4, four microframes are transmitted consecutively, and the payloads of the three endpoints are divided to be transmitted among the four microframes.

Eight data packets in a first microframe 402 are allocated to the endpoint EP A first. An entire payload of the endpoint EP A is transmitted with the first microframe 402. Then, eight data packets in the first microframe 402 are allocated to the endpoint EP B. No more data packets in the first microframe 402 are allocated to the low-priority endpoint EP C.

A second microframe 404 follows the first microframe 402. As shown in FIG. 4, eight data packets in the second microframe 404 are allocated to the endpoint EP A first to transmit an entire payload of the endpoint EP A. Then, two data packets in the second microframe 404 are allocated to the endpoint EP B for the remaining payload that is not transmitted with the first microframe 402. Six data packets remaining in the second microframe 404 are allocated to the endpoint EP C.

A third microframe 406 that follows the second microframe 404 is allocated similarly to the first microframe 402. A fourth microframe 408 is used for the remaining payload (e.g., two data packets) of the endpoint EP B that is not transmitted with the third microframe 406 and the remaining payload (e.g., six data packets) of the endpoint EP C that is not transmitted with the second microframe 404.

Figure 5:
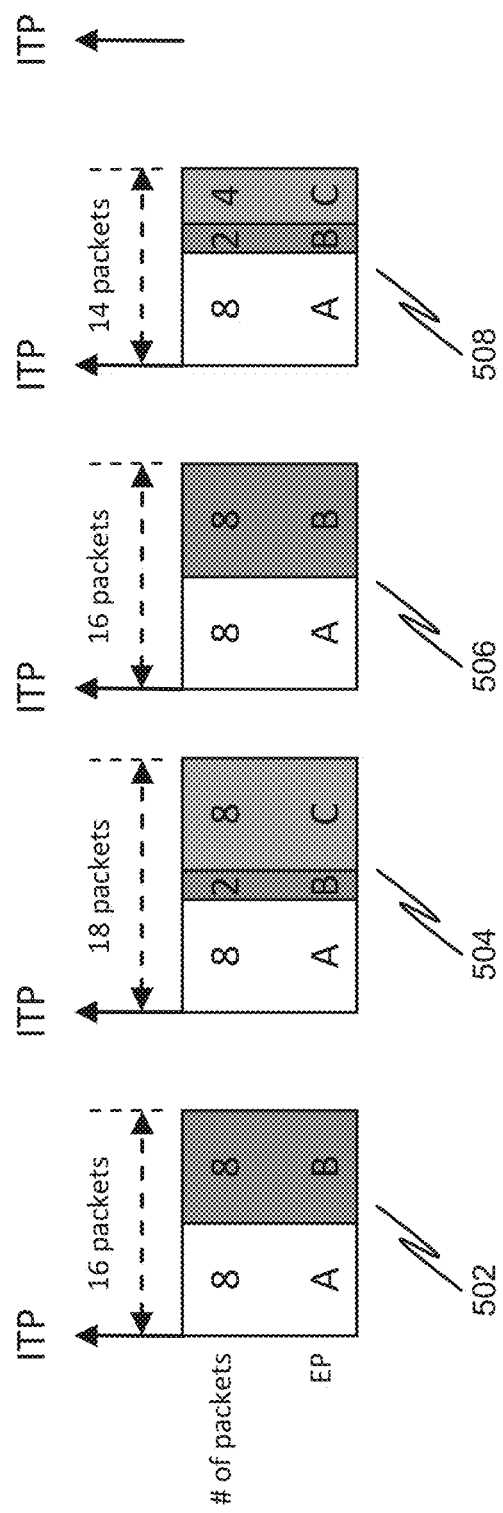
FIG. 5 depicts another example diagram showing data transfers for three endpoints.

FIG. 5 depicts another example diagram showing data transfers for three endpoints. As shown in FIG. 5, data from the three endpoints (e.g., EP A, EP B and EP C) is transferred periodically using multiple microframes. Specifically, in addition to the 16 data packets that are used for periodic data transfers, more data packets in a microframe may be reserved for periodic data transfers under certain circumstances.

As shown in FIG. 5, eight data packets in a first microframe 502 are allocated to the endpoint EP A first. An entire payload of the endpoint EP A is transmitted with the first microframe 502. Then, eight data packets in the first microframe 502 are allocated to the endpoint EP B. No more data packets in the first microframe 502 are allocated to the low-priority endpoint EP C.

A second microframe 504 follows the first microframe 502. As shown in FIG. 5, eight data packets in the second microframe 504 are allocated to the endpoint EP A first to transmit an entire payload of the endpoint EP A. Then, two data packets in the second microframe 504 are allocated to the endpoint EP B for the remaining payload that is not transmitted with the first microframe 502. In addition to the six data packets remaining in the second microframe 404, two more data packets are allocated to the endpoint EP C so that eight data packets of the payload of the endpoint EP C can be transmitted with the second microframe 504.

A third microframe 506 that follows the second microframe 504 is allocated similarly to the first microframe 502. A fourth microframe 508 is used for the remaining payload (e.g., two data packets) of the endpoint EP B that is not transmitted with the third microframe 506 and the remaining payload (e.g., four data packets) of the endpoint EP C that is not transmitted with the second microframe 504. Dividing the payload of the endpoint EP C, 12 data packets, into an eight-packet part and a four-packet part complies with the requirements of the USB3 specification. For example, the number of data packets in a partial payload of an endpoint corresponds to a power of two (e.g., 1, 2, 4, 8, etc.).

In some embodiments, seven data packets corresponding to 15 µs are reserved as overflow bus time. For example, the available bandwidth for periodic data transfers is up to about 110 µs (or 50 data packets). The seven data packets reserved as overflow bus time may be used for periodic data transfers in addition to the available bandwidth under certain circumstances. The reserved data packets can be used for non-periodic data transfers (e.g., bulk data transfers, control data transfers) as well.

Figure 6:
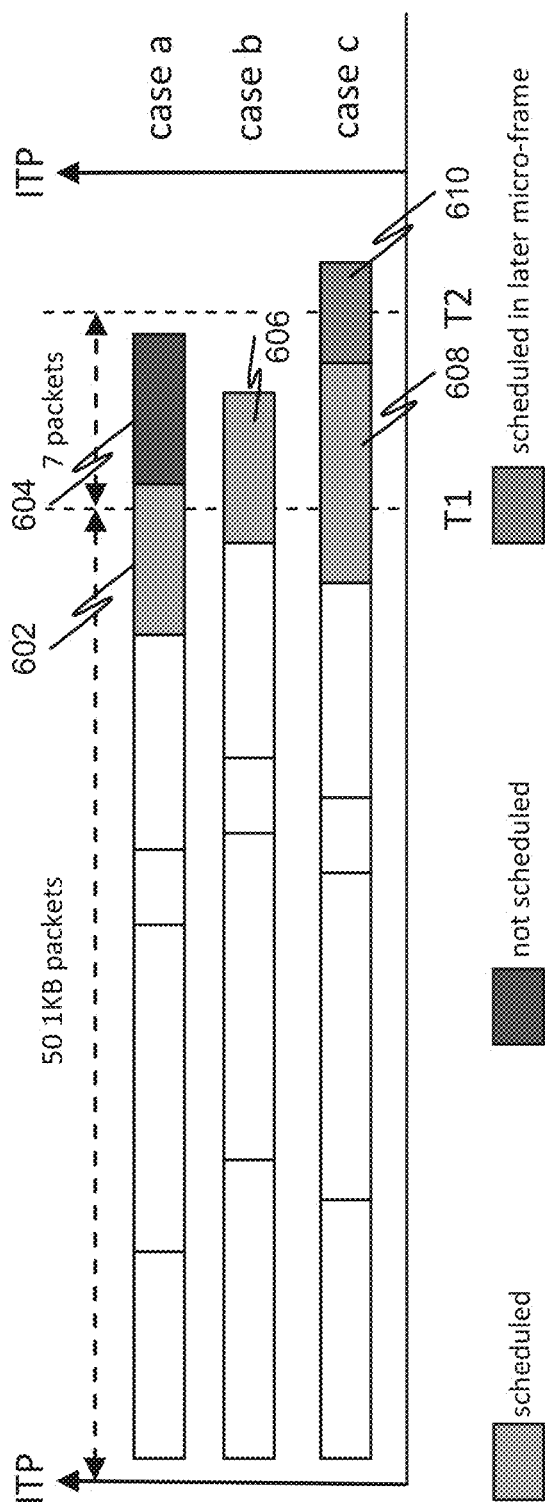
FIG. 6 depicts an example diagram showing different cases for data transfer scheduling.

FIG. 6 depicts an example diagram showing different cases for data transfer scheduling. As shown in FIG. 6, a bandwidth T1 (e.g., corresponding to 50 data packets) is set as a budget for periodic transfers in each microframe. Multiple data packets (e.g., seven data packets) are reserved as overflow bus time that can be used for periodic transfers under certain circumstances.

Specifically, in case a, data packets are allocated to multiple endpoints. The remaining data packets under the budget T1 are not enough for transmission of a payload 602 of an additional endpoint. However, the reserved data packets can be used together with the remaining data packets to transmit the payload 602. Even though the rest of the reserved data packets may be enough for transmission of a payload 604 of another endpoint, such transmission is not scheduled because the budget T1 has been exceeded already.

In case b, the reserved data packets are used for transmission of a payload 606 of an endpoint. The rest of the reserved data packets may not be used for periodic data transfers, but may be used for non-periodic data transfers. In case c, after data packets are allocated to multiple endpoints, the remaining data packets under the budget T1 in combination with the reserved data packets are not enough for transmission of a payload of an additional endpoint. The payload of the additional endpoint may be divided into two parts, where the first part 608 (e.g., eight data packets) is transmitted with the current microframe and the second part 610 is scheduled for transmission with a next microframe.

Figure 7:
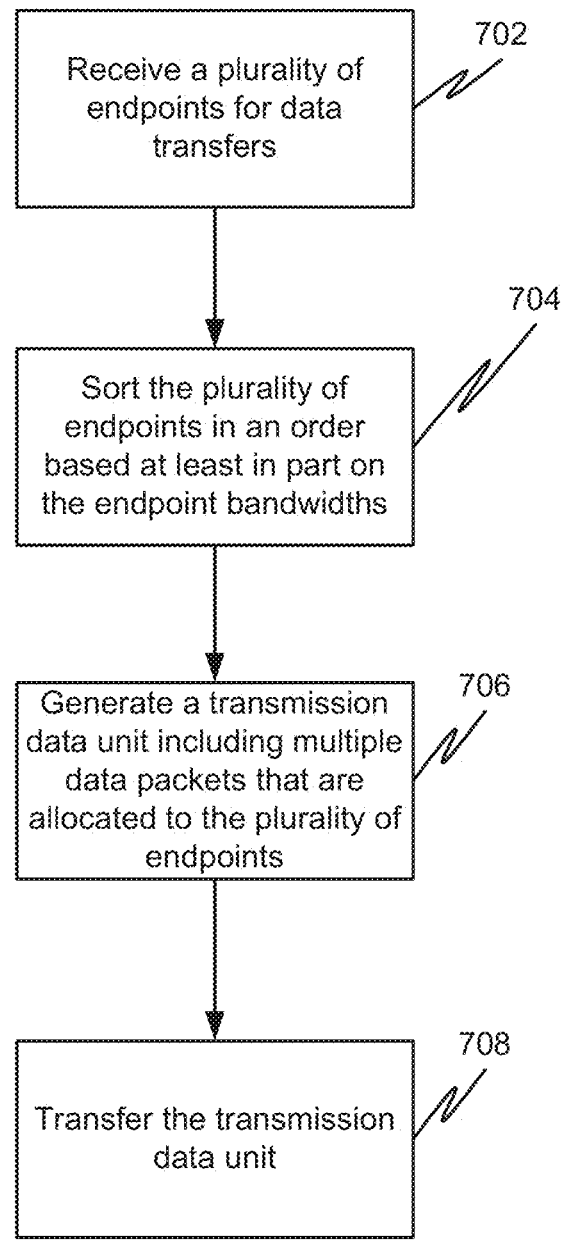
FIG. 7 depicts an example flow diagram for managing USB data transfers.

FIG. 7 depicts an example flow diagram for managing USB data transfers. At 702, a plurality of endpoints are received for data transfers. An endpoint corresponds to a portion of a USB device and is associated with an endpoint bandwidth. At 704, the plurality of endpoints are sorted in an order based at least in part on the endpoint bandwidths. At 706, a transmission data unit including multiple data packets is generated. The data packets are allocated to the plurality of endpoints based at least in part on the order. At 708, the first transmission data unit is transmitted.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for managing universal-serial-bus (USB) data transfers, the system comprising:
   a non-transitory computer-readable storage medium including a first scheduling queue for sorting endpoints; and
   a host controller configured to:
      store a plurality of endpoints for data transfers to the storage medium, an endpoint corresponding to a portion of a USB device, wherein each endpoint is associated with an endpoint frequency;
      sort the plurality of endpoints in the first scheduling queue in a descending order based at least partially on endpoint frequency, such that a first endpoint associated with a highest frequency among the plurality of endpoints is stored at a top of the first scheduling queue;
      generate a first transmission data unit that includes multiple data packets that are allocated to the plurality of endpoints based at least in part on the descending order; and
      transfer the first transmission data unit.

2. The system of claim 1, wherein the endpoints are associated with a plurality of endpoint bandwidths, and the first scheduling queue is configured to store the plurality of endpoints in the descending order, such that a first endpoint associated with a highest endpoint bandwidth among the plurality of endpoints is stored at a top of the first scheduling queue.

3. The system of claim 1, wherein:
the non-transitory computer-readable storage medium includes a second scheduling queue that is configured to store the plurality of endpoints that are stored in the first scheduling queue; and
the host controller is further configured to:
receive a new endpoint;
store the new endpoint to the second scheduling queue, resulting in the second scheduling queue including a new plurality of endpoints comprising both (i) the plurality of endpoints that are stored in the first scheduling queue and (ii) the new endpoint;
sort the new plurality of endpoints in the second scheduling queue; and
switch from the first scheduling queue being active to the second scheduling queue being active to generate a new transmission data unit for the new plurality of endpoints.

4. The system of claim 1, wherein:
the plurality of endpoints include a first endpoint associated with a first payload and a second endpoint associated with a second payload, the first endpoint having a higher priority in the descending order than the second endpoint; and
the host controller is further configured to:
allocate the entire first payload into the first transmission data unit;
divide the second payload into a first portion and a second portion;
allocate the first portion into the first transmission data unit, following the first payload;
allocate an entire third payload, associated with the first endpoint, into a second transmission data unit that is transmitted after the first transmission data unit; and
allocate the second portion into the second transmission data unit, following the third payload.

5. The system of claim 1, wherein:
the plurality of endpoints include a first endpoint associated with a first payload, a second endpoint associated with a second payload, and a third endpoint associated with a third payload, the first payload corresponding to a first number of data packets, the second payload corresponding to a second number of data packets, the third payload corresponding to a third number of data packets, the first endpoint having a higher priority than the second endpoint, the second endpoint having a higher priority than the third endpoint according to the first order; and
the host controller is further configured to:
allocate the first number of data packets in the first transmission data unit to the first endpoint;
divide the second number of data packets into a fourth number of data packets and a fifth number of data packets;
allocate the fourth number of data packets in the first transmission data unit to the second endpoint;
allocate the fifth number of data packets in a second transmission data unit to the second endpoint, the second transmission data unit being transmitted after the first transmission data unit;
divide the third number of data packets into a sixth number of data packets and a seventh number of data packets;
allocate the sixth number of packets in the second transmission data unit to the third endpoint; and
allocate the seventh number of data packets in a third transmission data unit to the third endpoint, the third transmission data unit being transmitted after the second transmission data unit.

6. The system of claim 1, wherein the host controller is further configured to generate an error signal in response to a total bandwidth being smaller than an available bandwidth, the total bandwidth being equal to a sum of initial endpoint bandwidths associated with the plurality of endpoints.

7. A system for managing universal-serial-bus (USB) data transfers, the system comprising:
a non-transitory computer-readable storage medium including a first scheduling queue for sorting endpoints; and
a host controller configured to:
store a plurality of endpoints for data transfers to the storage medium, an endpoint corresponding to a portion of a USB device;
sort the plurality of endpoints in a first order;
generate a first transmission data unit including multiple original data packets, the original data packets being allocated to the plurality of endpoints based at least in part on the first order; and
transfer the first transmission data unit;
wherein:
the plurality of endpoints include one or more first endpoints and a second endpoint, the first endpoints having a higher priority than the second endpoint, the second endpoint being associated with a second payload corresponding to a second number of data packets;
the host controller is further configured to:
allocate a first number of data packets in the first transmission data unit to the one or more first endpoints, the remaining first transmission data unit corresponding to a third number of data packets;
divide the second number of data packets into a fourth number of data packets and a fifth number of data packets; and
in response to the third number of data packets being less than the fourth number of data packets, allocate the third number of data packets in the first transmission data unit and a sixth number of data packets for overflow to the second endpoint, the fourth number of data packets being equal to a sum of the third number of data packets and the sixth number of data packets.

8. A method for managing universal-serial-bus (USB) data transfers, the method comprising:
receiving a plurality of endpoints for data transfers, an endpoint corresponding to a portion of a USB device, wherein each endpoint is associated with an endpoint frequency;
sorting the plurality of endpoints in the first scheduling queue in a descending order based at least partially on endpoint frequency, such that a first endpoint associated with a highest frequency among the plurality of endpoints is stored at a top of the first scheduling queue;
generating a first transmission data unit that includes multiple data packets that are allocated to the plurality of endpoints based at least in part on the descending order; and
transferring the first transmission data unit.

9. The method of claim 8, wherein:
the endpoints are associated with a plurality of endpoint bandwidths;

the plurality of endpoints are sorted in a descending order based at least in part on the endpoint bandwidths such that a first endpoint associated with a highest endpoint bandwidth among the plurality of endpoints is stored at a top of the first scheduling queue; and the original data packets are allocated to the sorted plurality of endpoints.

10. The method of claim 8, further comprising:

receiving a new endpoint;

storing the new endpoint into a second scheduling queue, resulting in the second scheduling queue including a new plurality of endpoints comprising both (i) the plurality of endpoints that are stored in the first scheduling queue and (ii) the new endpoint;

sorting the new plurality of endpoints in the second scheduling queue; and switching from the first scheduling queue being active to the second scheduling queue being active to generate a new transmission data unit for the new plurality of endpoints.

11. The method of claim 8, wherein:

the plurality of endpoints include a first endpoint associated with a first payload and a second endpoint associated with a second payload, the first endpoint having a higher priority in the descending order than the second endpoint; and the method further includes:

allocating the entire first payload into the first transmission data unit;

dividing the second payload into a first portion and a second portion;

allocating the first portion into the first transmission data unit, following the first payload;

allocating an entire third payload, associated with the first endpoint, into a second transmission data unit that is transmitted after the first transmission data unit; and allocating the second portion into the second transmission data unit, following the third payload.

12. The method of claim 8, wherein:

the plurality of endpoints include a first endpoint associated with a first payload, a second endpoint associated with a second payload, and a third endpoint associated with a third payload, the first payload corresponding to a first number of data packets, the second payload corresponding to a second number of data packets, the third payload corresponding to a third number of data packets, the first endpoint having a higher priority than the second endpoint, the second endpoint having a higher priority than the third endpoint according to the first order; and the method further includes:

allocating the first number of data packets in the first transmission data unit to the first endpoint;

dividing the second number of data packets into a fourth number of data packets and a fifth number of data packets;

allocating the fourth number of data packets in the first transmission data unit to the second endpoint;

allocating the fifth number of data packets in a second transmission data unit to the second endpoint, the second transmission data unit being transmitted after the first transmission data unit;

dividing the third number of data packets into a sixth number of data packets and a seventh number of data packets;

allocating the sixth number of packets in the second transmission data unit to the third endpoint; and allocating the seventh number of data packets in a third transmission data unit to the third endpoint, the third transmission data unit being transmitted after the second transmission data unit.

13. The method of claim 8, further comprising:

performing isochronous data transfers or interrupt data transfers for the plurality of endpoints.

14. The method of claim 8, further comprising:

generating an error signal in response to a total bandwidth being smaller than an available bandwidth, the total bandwidth being equal to a sum of initial endpoint bandwidths associated with the plurality of endpoints.

15. A method for managing universal-serial-bus (USB) data transfers, the method comprising:

receiving a plurality of endpoints for data transfers, an endpoint corresponding to a portion of a USB device;

sorting the plurality of endpoints in a first order;

generating a first transmission data unit including multiple original data packets, the original data packets being allocated to the plurality of endpoints based at least in part on the first order; and transferring the first transmission data unit;

wherein:

the plurality of endpoints include one or more first endpoints and a second endpoint, the first endpoints having a higher priority than the second endpoint, the second endpoint being associated with a second payload corresponding to a second number of data packets;

the method further includes:

allocating a first number of data packets in the first transmission data unit to the one or more first endpoints, the remaining first transmission data unit corresponding to a third number of data packets;

dividing the second number of data packets into a fourth number of data packets and a fifth number of data packets; and in response to the third number of data packets being less than the fourth number of data packets, allocating the third number of data packets in the first transmission data unit and a sixth number of data packets for overflow to the second endpoint, the fourth number of data packets being equal to a sum of the third number of data packets and the sixth number of data packets.

16. A non-transitory machine-readable storage medium comprising programming instructions for managing universal-serial-bus (USB) data transfers, the programming instructions configured to cause one or more data processors to execute operations comprising:

receiving a plurality of endpoints for data transfers, an endpoint corresponding to a portion of a USB device, wherein each endpoint is associated with an endpoint frequency;

sorting the plurality of endpoints in the first queue in a descending order based at least partially on frequency, such that a first endpoint associated with a highest frequency among the plurality of endpoints is stored at a top of the first scheduling queue;

generating a first transmission data unit that includes multiple data packets that are allocated to the plurality of endpoints based at least in part on the first descending order; and transferring the first transmission data unit.

* * * * *